June 18, 1957 — V. D. TOCCHETTO — 2,796,289
ADJUSTABLE SUN VISORS FOR MOTOR VEHICLES
Filed Feb. 25, 1954
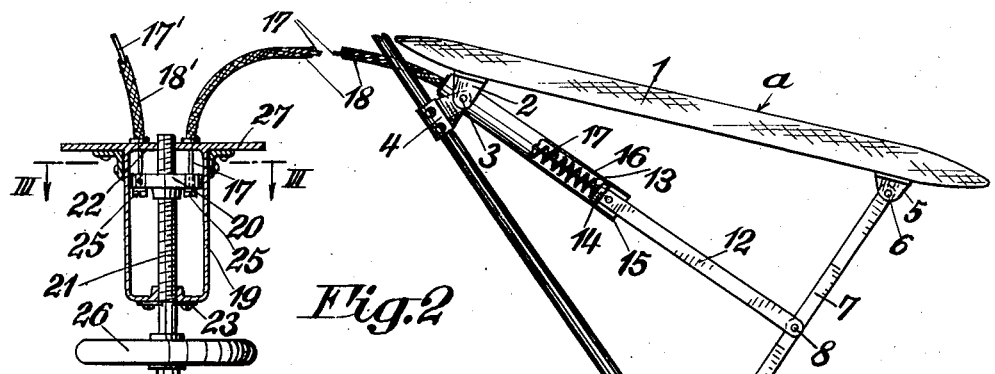
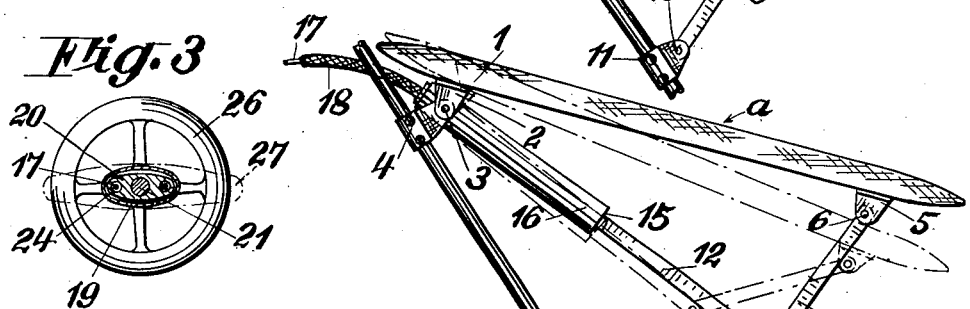
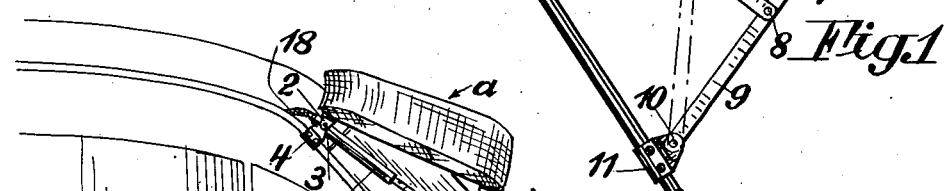
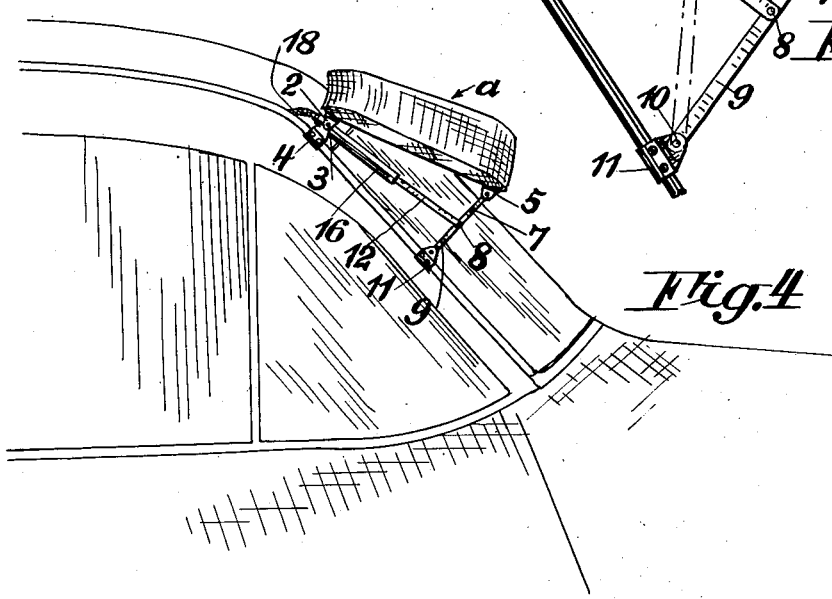

United States Patent Office 2,796,289
Patented June 18, 1957

2,796,289

ADJUSTABLE SUN VISORS FOR MOTOR VEHICLES

Virgil Dante Tocchetto, Montevideo, Uruguay

Application February 25, 1954, Serial No. 412,566

1 Claim. (Cl. 296—95)

This invention refers to sun visors preferably on motorized vehicles, and particularly provides for a better adjustment of the slant of the visor according to necessity, said means for adjustment being controlled from the interior of the coupe of said vehicles.

According to the objects of the present invention the sun visor especially comprises a sun visor shield or sheet of the generally known type such as by example of an oblong shape, externally mounted to the front of a motorized or other vehicle and rocking immediately close above the top line of the windshield; according to the invention the degree of inclination or slant of the sun visor is controlled by actuating means located in the interior of the body within hand reach of the driver, and in a way as not to baffle free vision.

It is an object of the present invention to bring forth the said variations by the action of flexible tensors coupled to means suitable to amplify the impact imparted to the actuating means by the driver's force.

Every driver is familiar with the inconveniences which require the provision of a sun visor. Although visors mounted to the outside as they are in general use nowa-days are superior to the ancient inside visors they still show the drawback of compelling the driver to stop, descend from the vehicle and to go through a number of unpleasant operations when a change of the slant of the visor becomes necessary. The present invention does away with such inconveniences and allows the change of the visor's position without the driver having to leave his seat.

The inventive visor or rather the inventive assembly is shown in the accompanying drawings in which:

Figure 1 illustrates a side view of the visor showing the miscellaneous articulations and the means to vary the position of the visor, Figure 2 is a side view of the visor, partly in section thus demonstrating the working for adjustment; this figure also shows the means which are suitable to amplify the impact exerted on the tensors or connecting links to the elements which immediately serve to change the position of the visor, or in other words which immediately serve to tilt the visor in both directions.

Figure 3 shows a detail, partly in section. It is a cross section of the frame work or box which supports a non-rising spindle therein and guides a travelling nut, as described later, finally Figure 4 is a perspective view of the appearance of a motorized vehicle which is equipped with an inventive visor.

According to Fig. 1 the visor according to the invention, that is the visor combination comprises a visor-sheet or shield 1, which may be made of any suitable material such as metal, plastic, frosted or dark colored glass etc. It should show a finish for good appearance. On both of its lateral edges sheet 1, near to its upper longer edge it has lugs 2 hinged by means of stubs 3 to clamps or lugs 4 which arrangement permits tilting the visor by rocking in said pivots. Clamps 4 are fastened to the frame work of the car body.

Similar lugs 5 are provided close to the lower long edge of the visor to which, at each side a link 7 is hinged by means of stubs 6. The other end of bar or link 7 is hinged to a similar bar 9 which at its other end is hinged at 10 to a clamp 11; the latter is solidly fastened to the frame work of the vehicle, and a shaft 8 is provided where said bars 7 and 9 are hinged together, which shaft also hingedly supports another rod 12, hereinafter defined as the operating rod. Said operating rod enters into a tubular member or casing 16, which at its opposite end is hinged onto shaft 3 and may rock according to necessity beneath shield 1 commensurate to the tilting movement of said shield.

The picture drawn in solid lines in Fig. 1 demonstrates the maximum dihedral which may be formed between the shield 1 and the windshield of the vehicle to which the visor assembly is attached while the dotted lines represent a deeper position that is a steeper position of the visor.

If a traction or tension is exerted on operating rod 12 which is the case if the actuating means are operated, operating rod 12 will move into said tubular member 16 toward the rear end of the latter; said movement is caused by tensor 17 which is connected to said actuating means as described later in detail.

By the movement of operating rod 12, bars 7 and 9 will have to leave their position in which one was substantially an extension of the other, they will start to form an angle between them, its vertex being at hinge 8 and in consequence the original distance between lugs 5 and 10 will diminish so that the lower edge of the visor will have to tilt down or in other words approach the windshield while the upper edge of the visor will rock, essentially around pivot 3, which is stationary.

To bring forth the tilting of the visor, as above described, means are required capable to actuate the lever system 7, 9 and 12. Such inventive means are now shown in detail by Fig. 2 and described as follows:

The operating rod 12 bears at its end a washer-like plate 14, suitable to slide rather snugly in tubular member 16 but cannot leave it due to an annular bottom 15 of said tubular member; said bottom as may be readily seen permits just the passage of rod 12 but not of plate 14. A pressure coil spring 13 is housed in said tubular member 16 said coil spring bearing against plate 14 tends to bring levers 7 and 9 back into their original straight position which would cause shield 1 to stay in its top or in other words most flat position. As mentioned above a tensor 17 (that is one at each side of shield 1) is fastened to plate 14, said tensor being formed of a flexible wire. Said tensor 17 follows in general the axis of said tubular member 16 and then enters a metal hose or guide 18 which is co-axially fastened to said tubular member 13, runs along said metal hose and finally enters a box-like frame 19 of oblong cross section with bores in its top cover 22. A travelling nut 20 is provided in that box, shaped to be lengthwise slidable therein, but prevented from spinning due to the mentioned oblong cross section of said frame; said nut embraces or meshes a non-rising spindle or stem 21 held stationary by top and bottom covers 22 and 23 respectively of said frame 19. Nut 20 has two bores 24 in which the ends of tensors 17, 17' enter. Said ends bear stops 25 which prevent their escape from nut 20. Tensors 17, 17' are of such length as to allow the operating rod 12 to take its maximum projection out of tubular member 16 and this is the position which would allow the visor shield to take its highest or top position. In this position nut 20 is close to top cover 22 of said box-like frame. The arrangement is such that the stops 25 always close up snugly to the bottom side of nut 20 even when said nut 20 is in its top position. Spindle or stem 21 has at its lower end after traversing the bottom cover 23 of said frame an operating crank or handle 26 so that by turning said non-rising spindle in one or the other sense the nut is raised or lowered. By the latter move the tensors 17, 17' will pull the visor's shield down. A plate 27 in alignment with top cover 22 having perforations 28 serve installation purposes of said frame to the body of said vehicle, essentially at the inside of said body.

While the system is shown at one side of the vehicle it is a matter of self-explanation that the same unit is to be found at the other side, with the frame and nut common in general to both of said units, so that both units are actuated by one operation and the impact will uniformly go to both sides of the visor's shield.

The slight up-and-down movements of hinge 8 which occur due to the adjustment of said shield are met by the arrangement in which tubular member 16 may rock with the shield and its extension, the metal hose 18, is made flexible. In case the top position of the visor is desired, or a higher position in general, the crank is turned in a way to raise the nut, whereupon the coil springs will push out operating rod 12 from said tubular protecting member 16 as far as it may be allowed to go, plates 14 and 15 co-operating in that stopping effect. Fig. 4 illustrates a motorized vehicle equipped with an inventive visor "a." As may be noted the inventive visor offers the usual appearance and its mechanism is located in a way not to hinder the free vision of the operator.

It is to be well understood that the device herein described is shown in detail by way of illustration or example. Of course, it allows for miscellaneous variations or modifications as they may occur to men skilled in the art without using a flash of genius. Such alterations should not be understood to be a departure from my invention or creation beyond the scope thereof because it would be impossible to cover every embodiment which would use differing mechanical elements. What I claim in principle and wish to protect by Letters Patent is:

In a visor pivotally mounted to the external front side of a vehicle, lugs on both sides of said visor, corresponding lugs fastened to the body of said vehicle, levers hinged with one of their ends in said lugs and hinged together at their other ends, operating rods hinged with one of their ends in said hinges linking together said pair of levers, flexible wire-like tensors, each fastened with its first end to the respective other end of said operating rods, a stationary frame inside said vehicle, a threaded nut guided by said frame, the second ends of said tensors being fastened to said nut, a threaded fixed spindle in said frame, said nut meshing with said spindle, coil pressure springs each embracing a tensor, said coil springs being fitted to tension one of the flexible tensors, casings of tubular shape, each suitable to house one of said springs, said casings being pivotable at the pivoting points of said visor, means to limit an outward movement of said operating rods, vehicle-frame piercing hollow guides for said tensors, said guides inside of said vehicle body conforming in general with the upper portion of said body.

References Cited in the file of this patent

UNITED STATES PATENTS

| | | |
|---|---|---|
| 1,331,311 | Au | Feb. 17, 1920 |
| 1,848,909 | Simon | Mar. 8, 1932 |
| 2,195,400 | Arens | Apr. 2, 1940 |
| 2,447,246 | Groboski et al. | Aug. 17, 1948 |